H. L. DE ZENG.
OPTOMETER.
APPLICATION FILED DEC. 29, 1908.

941,766.

Patented Nov. 30, 1909.
4 SHEETS—SHEET 1.

Witnesses
Henry F. Dietrich
L. Couville

Inventor
Henry L. De Zeng.
By Wiedersheim & Fairbanks
Attorneys

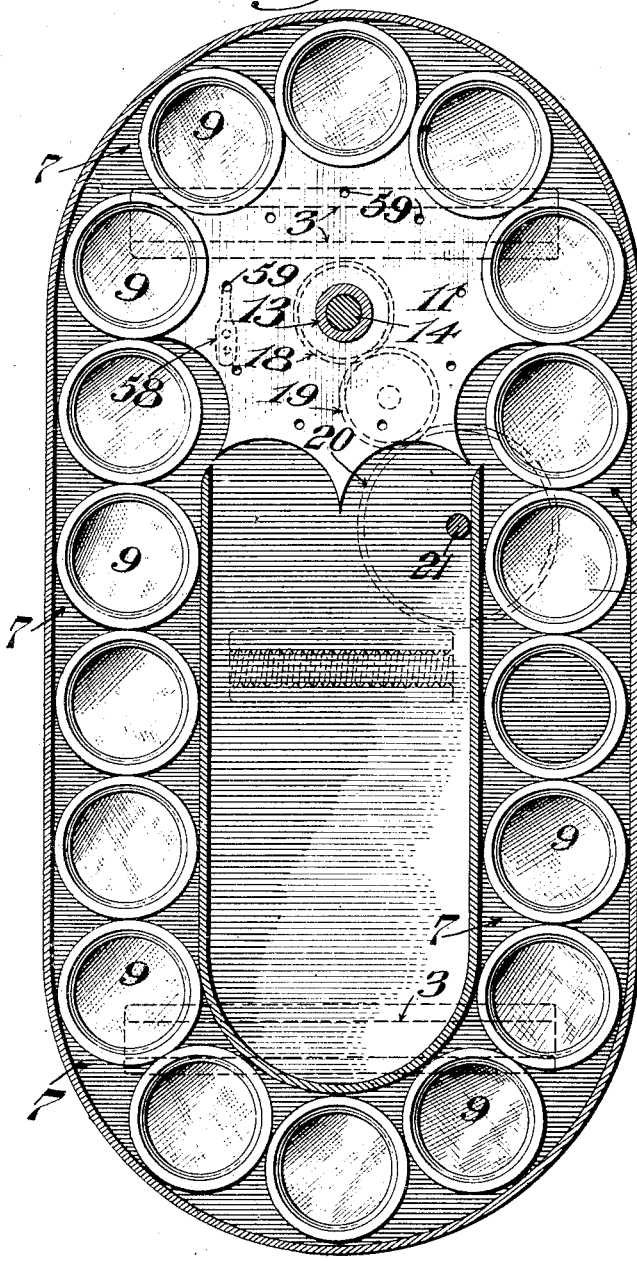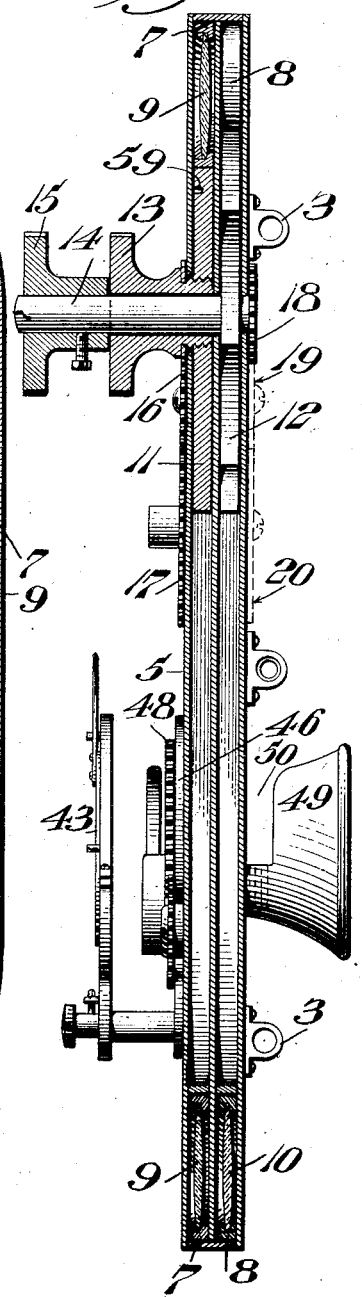

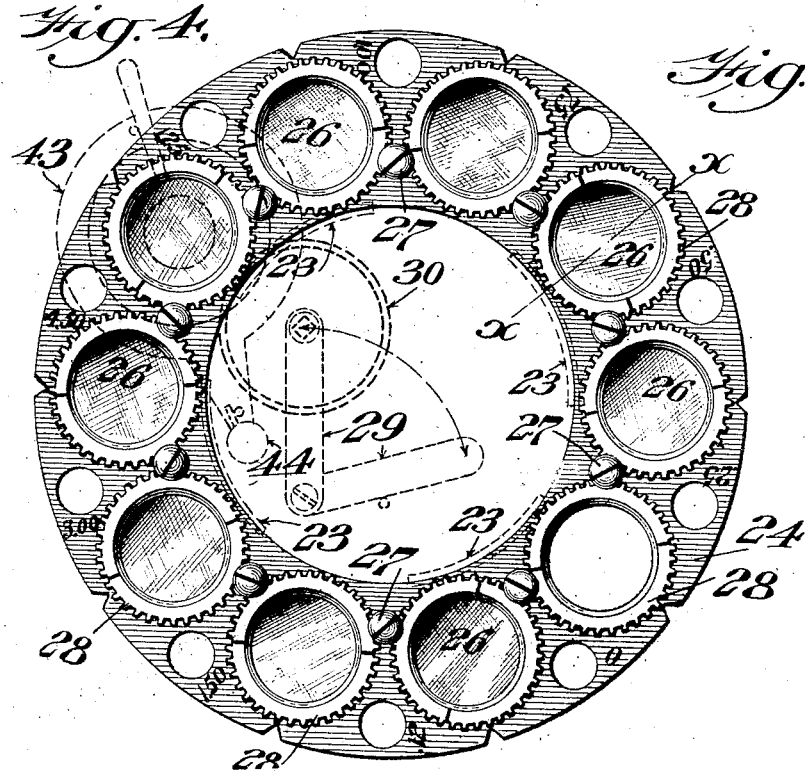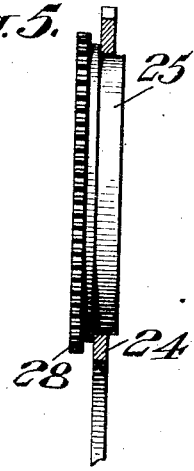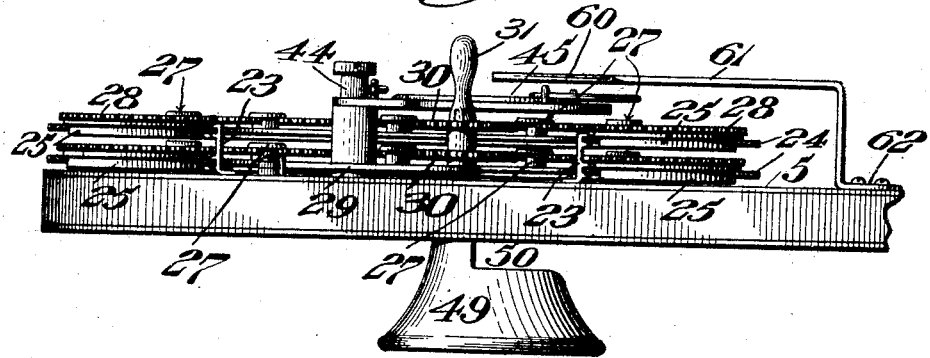

H. L. DE ZENG.
OPTOMETER.
APPLICATION FILED DEC. 29, 1908.
941,766.
Patented Nov. 30, 1909.
4 SHEETS—SHEET 4.
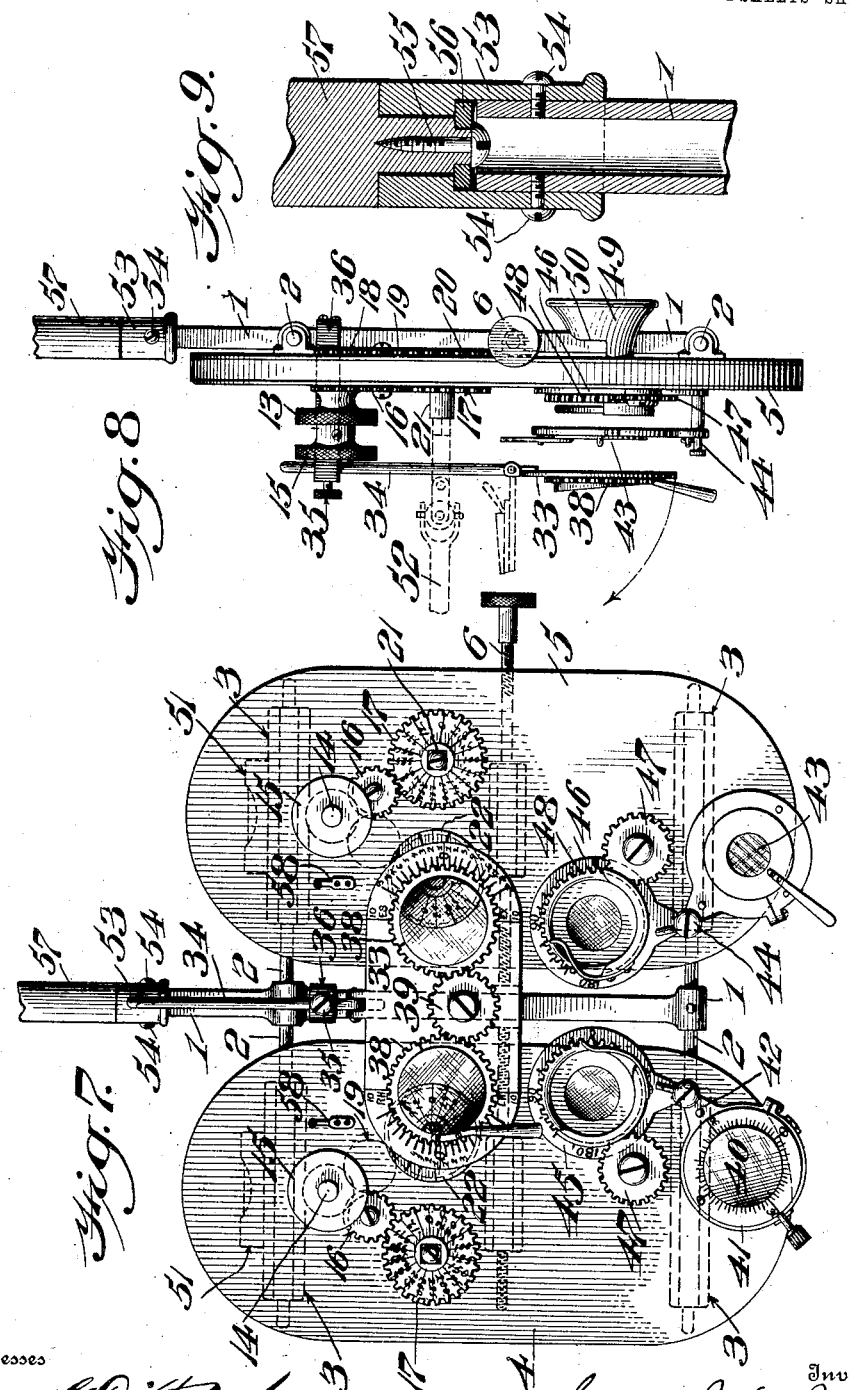

UNITED STATES PATENT OFFICE.

HENRY L. DE ZENG, OF MAPLE SHADE, NEW JERSEY.

OPTOMETER.

941,766.

Specification of Letters Patent. Patented Nov. 30, 1909.

Application filed December 29, 1908. Serial No. 469,783.

*To all whom it may concern:*

Be it known that I, HENRY L. DE ZENG, a citizen of the United States, residing at Maple Shade, in the county of Burlington, State of New Jersey, have invented a new and useful Optometer, of which the following is a specification.

My invention relates to a new and useful optometer and consists in suitably supporting series of spherical lenses of means for presenting the same in suitable position before the eye and of means for indicating what lenses have been so presented.

It further consists in mounting the said spherical lenses in casings and in adjustably mounting the casings.

It further consists in rotatably mounting a series of cylindrical lenses whereby the same can be moved into position to co-act with the spherical lenses with means for independent axial rotation for each of the cylindrical lenses.

It further consists in adjustably mounting a phorometer whereby the same can be thrown into or out of operative position.

It further consists in pivotally mounting a double rotary prism for making tests for abduction and adduction.

It further consists in pivotally mounting a Maddox rod or corrugated glass disk whereby the same can be thrown into or out of operative position.

It further consists of novel details of construction all as will be hereinafter set forth.

Figure 1:
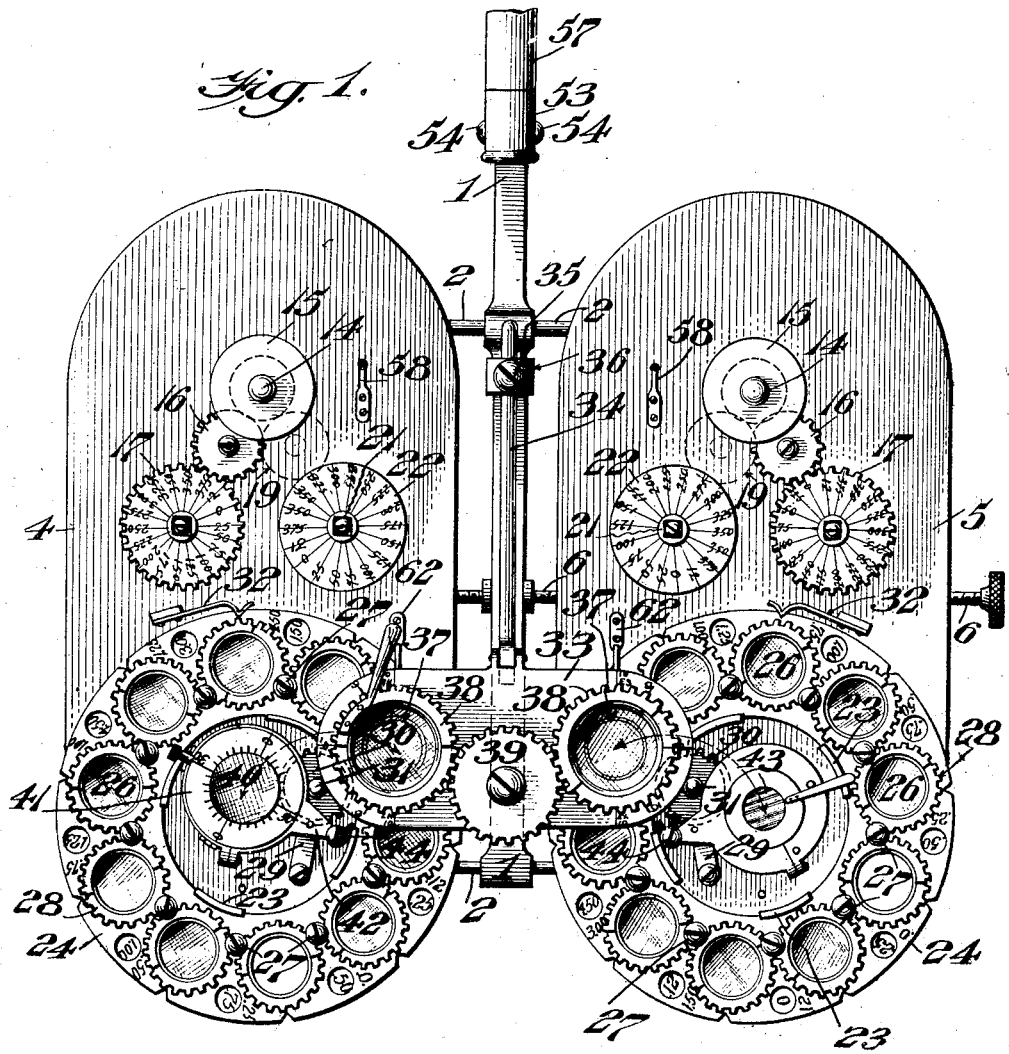
Figure 10:
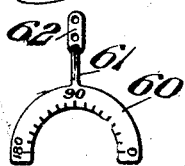

Figure 1 represents a front elevation of an optometer embodying my invention. Fig. 2 represents a view showing the interior of one of the casings on an enlarged scale. Fig. 3 represents a vertical sectional view of one of the casings showing the manner of operating the two series of lenses. Fig. 4 represents a view on an enlarged scale, showing one of the rotatable disks containing cylindrical lenses. Fig. 5 represents a section on line x—4, Fig. 4. Fig. 6 represents a plan view of a portion of one of the casings carrying the attachments. Fig. 7 represents a front elevation of the optometer with the rotatable disks removed. Fig. 8 represents a side elevation of the device shown in Fig. 7. Fig. 9 represents a sectional view of the connection with the support. Fig. 10 represents on a small scale the vernier employed.

Similar numerals of reference indicate corresponding parts in the figures.

Referring to the drawings: In the present manner of testing eyes wherein lenses from a case are placed in a suitable holder before the eyes of a patient, it is difficult for the patient to remember the effect produced by the lenses and to carry in mind which combination produced the best results. In addition, considerable time is consumed and care must be exercised in replacing the lenses in the cases in their proper places. My invention is designed to overcome these defects and in the drawings I have shown a device forming one embodiment of my invention and which I have found will operate successfully in practice but it will be evident that the arrangement of the parts may be varied, other instrumentalities may be employed, and changes may be made in the construction which will come within the scope of my invention and I do not, therefore, desire to be limited in every instance to the exact forms as herein shown and described but desire to make such changes as may be necessary.

My invention is designed to be preferably carried upon a bracket or other suitable support in which 1 designates a rod adapted to be suitably connected with the bracket and on which rod or support the bars 2 extend on opposite sides of said rod, said bars being adapted to receive sleeves 3, which are carried by or connected with the casings 4 and 5.

6 designates a rod having right and left screw threads at suitable points thereon which are in suitable engagement with the casings 4 and 5 whereby it will be understood that by the proper rotation of the rod 6 the said casings 4 and 5 are caused to move toward or away from each other, sliding along the bars 2 as will be evident. The casings 4 and 5 are of any suitable construction and are provided with the two runways or guides 7 and 8 in which are situated two series of spherical lenses 9 and 10 said lenses it being understood being mounted in suitable cells and one of the cells in each series being blank, that is to say, contains no lens nor a plain glass and it being further understood that each series of lenses 9 and 10 are adapted for independent movement. The casings 4 and 5 are provided at a suitable point with openings through which the patient can see and through which the operator can examine into the patient's eye and by proper manipulation of the series of lenses 9 and 10 any of the lenses or the blank lens in the series can be brought into register with the openings in the casing so that any combination of the lenses may be obtained as desired.

In order to obtain the independent operation of the lenses I have shown two spur wheels or sprockets 11 and 12 one of which as 11, is in threaded engagement with the thumb nut 13 which extends through the wall of the casing and can be engaged by the hand of the operator for rotating the same, the teeth or spurs on the sprocket as will be more clearly understood from Fig. 2, being so arranged as to engage with the walls of the lens-cells of the series 9 in order that by the rotation of the sprocket, the entire series of lenses is caused to move in the race-way 7. The thumb nut 13 is provided with a suitable hole through which passes a pin 14 which is connected with the spur wheel or sprocket 12 and on which pin is mounted a suitable thumb nut 15 whereby it will be understood that by the rotation of the thumb nut 15 movement will be imparted to the pin 14 without imparting movement to the thumb nut 13 so that the sprocket wheel 12 which is connected with the pin 14 will be operated and as the teeth of this sprocket are in suitable engagement with the lens-cells of the series 10, the latter will be caused to move around the race-way 8 independently of the lenses 9. From this it will be seen that any lens in the series 9 can be positioned with respect to the opening in the casing after which any of the lenses in the series 10 can also be brought into register with the openings in order that the various combinations of lenses may be quickly and expeditiously placed in conjunction for test of the eyes of the patient. In order to indicate what lenses in either series are in position, in register with the opening, I have provided a gear 16, which meshes with teeth carried by or on the thumb nut 13 and which also meshes with a toothed disk 17 on which are suitable indications, said disk 17 being rotatably mounted on the casing, it being understood that each of the casings 4 and 5 is provided with such disk and by the rotation of the thumb nut 13 the gear 16 is rotated which rotates the disk 17 and will indicate what lens of the series 9 is in position at the opening.

Mounted on the pin 14 upon the opposite side of the casing from that of the thumb nut 15 is the gear 18 which meshes with an idler 19 which rotates a gear 20 carried on a pin 21 which passes through the casing and has a disk 22 thereon and adjacent the disk 17 which disk 22 is provided with suitable indications so that by the rotation of the thumb nut 15 the said disk 22 will be rotated and will indicate what lens of the series 10 is in register with the openings in the casing. From this it will be understood that I have provided means for positioning lenses in register with an opening whereby any combination of the same may be made and I have provided means for indicating what lenses in each series are in the operative position.

In order to provide means for positioning the cylindrical lenses with respect to the openings in the casing, I mount clips 23 at suitable points on the casing which are adapted to engage with disks 24, two of which it will be seen are mounted upon each of the casings 4 and 5, said disks having suitable openings therein in which are mounted the lens cells 25 all but one of which in each disk contains a lens 26 so that said lenses are in series and one of said cells in each disk being blank or containing a plain glass. Any suitable means for rotatably holding these cells and lenses in position on the disks may be employed and in the drawings I have shown the screws 27 for this purpose which prevent the cells from leaving their proper position in the openings of their respective disks but permit axial rotation thereof. Upon the cells are the teeth 28 so that the same can be engaged by hand or suitable means for axial rotation. In the present instance I have shown an arm 29 pivotally connected with the frame, which carries pinion wheels 30 which are adapted to engage at the proper time or as desired, with the teeth 28 of any one of the cells 25 in either of the disks when the cells are moved into proper position therefor, that is when they register with the openings in the casings, a handle 31 on the wheels 30 being provided for ease in rotating the same. Any number of clips 23 may be employed it only being necessary to have a suitable number, in order that the disks will be properly held in position on the casing.

The operation of the devices just described will be as follows:—The disks 24 are rotated by hand causing the successive lenses to be brought into position in register with the openings in the casings 4 and 5 and any suitable means for indicating and holding the said disks in proper position in register with the openings may be employed. In the drawings, I have shown a spring catch 32 for this purpose which engages with a suitable small notch in the disk as each lens is properly positioned. After the desired lens in either or both disks on either casing (right or left) is in register with the openings in the casing, the arm 29, which meantime has been swung away, is moved into the position seen in full lines, Fig. 1, causing the teeth thereof to engage with the teeth 28 of the lens cells 25 and by rotating the wheel 30 axial rotation is given to the cylindrical lenses which are in proper position in register with the opening of the casing, thus obtaining a proper axis thereof. If desired of course I may dispense with the means for imparting axial rotation to the lenses and rotate the same by hand. From this it will be seen that I provide a double series of cylindrical lenses for each casing suitably actuated in order to be rotated into position to register with the openings in the casing, after which, axial rotation may be imparted to the proper cylindrical lens as described so that in conjunction with the spherical lenses previously described a suitable test of the eyes may be obtained. As I provide two series of cylindrical lenses capable of independent movement, any required cylindrical equivalent may be obtained by combining them, and two lenses, one in each series, can be axially rotated simultaneously, their axes being parallel with each other at all times. I desire it understood that I may mount the lenses 26 in any desired order employing both plus and minus in each or both disks as may be required to meet conditions, whereby any desired range of power or subdivisions thereof may be obtained.

While I have shown the cylindrical lenses capable of axial rotation mounted upon the casings in the disks, as described, I desire it understood that any suitable means for mounting or supporting said lenses may be employed which will permit the same to be moved in the proper position to register with the openings in the casing to obtain the different desired combinations, after which, radial rotation may be imparted to the said lenses, whereby their axes are parallel with each other at all times.

In order to measure the muscular imbalance I have adjustably mounted a phorometer which consists of a plate 33 pivotally connected with the rod 34 which is connected with the rod 1 by means of a set screw 35 passing through a suitable collar 36 through which the rod 34 passes, whereby it will be understood that the phorometer can be raised out of its operative position, as seen in Fig. 7 and held in its elevated or raised position during the test with the spherical and cylindrical lenses. In addition, the phorometer can be turned out of the way, as seen by dotted lines in Fig. 8, if desired. The phorometer is provided with suitable prisms 37 the cells for which are provided with teeth 38 adapted to mesh with the intermediate gear 39 whereby when one of the prisms is suitably rotated, the other prism is caused to axially rotate, it being understood that the prisms are so constructed and arranged that when in operative position they are directly in register with the openings in the casings 4 and 5, so that the same can be properly positioned for the eyes of the patient.

While I have shown and described one form of phorometer in connection with this invention, I desire it understood that any form which is suitable may be employed.

40 designates a double rotary prism for making tests for abduction and adduction, said prism being suitably mounted in a frame 41 carried by an arm 42 which is pivotally mounted on the casing 4, in the present instance, and which can be turned out of the way when it is not desired to use the same but can be moved over into position to register with the opening in the casing, when necessary.

43 designates a maddox rod for muscle tests which contains a glass disk and which is pivotally mounted at 44 on the casing 5 and which can be moved into or out of operative position as desired.

From the above it will be seen that I have provided the spherical lenses, the cylindrical lenses, the phorometer, the double rotary prisms and the maddox rod, all of which can be used to make a complete test of the eyes and to make such combination of the lenses as is necessary in said tests.

In some instances, I deem it advisable in place of mounting the cylindrical lens upon the disks to provide clips 45 and 46 which are mounted upon the casings 4 and 5 respectively and which clips are adapted to receive and hold lenses from a test case, it being noted that after the lenses are placed in position in the clips that the said lenses may be axially rotated by reason of the gears 47 meshing with the teeth 48 carried by the clips in which the lenses are seated. This may be desired in some instances where the operator desires to place the cylindrical lenses in position from the test case rather than employ the double series of cylindrical lenses previously described.

Upon the rear of each casing I mount an eye shield 49 having a cut away portion or recess 50 into which a supplemental lens can be placed or held, of high power, when required. In order to be sure that the casings are as nearly level as possible, I provide a level 51 and while I have shown one of these mounted on each casing, only one may be employed if desired and the location of the same may be varied as deemed expedient. In some instances it may be necessary to use the instrument as an objective test in which case I have provided a suitable extension rod or hand piece 52 attached to the mechanism controlling the movement of the spherical lenses in each casing, whereby an operator can sit at some distance in front of the instrument and have absolute control of the same.

In Fig. 9 I have shown a convenient manner of connecting the rod 1 with its support, the same consisting of a sleeve 53 adapted to receive the rod 1, the said parts being connected in any suitable manner, in the present instance by screw 54. The screw 55 and the washer 56 form a supporting means for holding the sleeve 53 in connection with the bracket arm 57 and permit free rotation between them.

In order to hold a spherical lens in the visual line, any suitable means may be employed and in the drawings I have shown a spring arm 58 connected with the casings and a suitable end passing through an opening in the casings and adapted to be seated in any one of the openings 59 formed in the spur wheels 11 and 12, whereby it will be understood that the spur wheels will be prevented from rotation, also the train of spherical lenses will be prevented from movement and the lenses in the visual line will be held there. Any suitable means for indicating the axial rotation of the cylindrical lenses at the visual line may be employed and I have shown in the drawings a vernier 60, carried by an arm 61, connected at 62 with the casing, the said vernier being situated adjacent the lenses, which are situated at the openings in the casings.

I desire it understood that while I have described my invention in relation to an optometer, it can be used in various optical instruments where the plurality of lens power is desirable.

Having thus described my invention, what I claim as new and desire to secure by Letters Patent, is:—

1. In an optical instrument, the combination of a suitable support, a phorometer, and a series of spherical lenses, the said spherical lenses being mounted to be brought routinely into visual alinement with the said phorometer.

2. In an optical instrument, the combination of a suitable support, a phorometer and a series of cylindrical lenses, the said cylindrical lenses being mounted to be brought routinely into visual alinement with the lenses of the said phorometer.

3. In an optical instrument, the combination of a suitable support, a phorometer, a series of spherical lenses and a series of cylindrical lenses, the said spherical lenses and the said cylindrical lenses being mounted to be brought routinely into visual alinement with the lenses of said phorometer.

4. In an optical instrument, the combination of a suitable support, a double rotary prism and a series of spherical lenses, the said spherical lenses being mounted to be brought routinely into visual alinement with the lenses of the double rotary prism.

5. In an optical instrument, the combination of a suitable support, a double rotary prism and a series of cylindrical lenses, the said cylindrical lenses being mounted to be brought routinely into visual alinement with the lenses of the said double rotary prism.

6. In an optical instrument, the combination of a suitable support, a double rotary prism, a series of spherical lenses and a series of cylindrical lenses, the said spherical lenses and the said cylindrical lenses being mounted to be brought routinely into visual alinement with the lenses of the said double rotary prism.

7. In an optical instrument, the combination of a suitable support, a maddox rod and a series of spherical lenses, the said spherical lenses being mounted to be brought routinely into visual alinement with the said maddox rod.

8. In an optical instrument, the combination of a suitable support, a maddox rod and a series of cylindrical lenses, the said cylindrical lenses being mounted to be brought routinely into visual alinement with the said maddox rod.

9. In an optical instrument, the combination of a suitable support, a phorometer, a double rotary prism and a series of spherical lenses, the said spherical lenses being mounted to be brought routinely into visual alinement with the lenses of the said phorometer and of the said double rotary prism.

10. In an optical instrument, the combination of a suitable support, a phorometer, a double rotary prism and a series of cylindrical lenses, the said cylindrical lenses being mounted to be brought routinely into visual alinement with the lenses of the said phorometer and of the said double rotary prism.

11. In an optical instrument, the combination of a suitable support, a phorometer, a maddox rod and a series of spherical lenses, the said spherical lenses being mounted to be brought routinely into visual alinement with the lenses of the said phorometer and with said maddox rod.

12. In an optical instrument, the combination of a suitable support, a phorometer, a maddox rod and a series of cylindrical lenses, the said cylindrical lenses being mounted to be brought routinely into visual alinement with the lenses of the said phorometer and with said maddox rod.

13. In an optical instrument, the combination of a suitable support, a phorometer, a maddox rod, a double rotary prism and a series of spherical lenses, the said spherical lenses being mounted to be brought routinely into visual alinement with the lenses of the said phorometer with the lenses of the double rotary prism and with the said maddox rod.

14. In an optical instrument, the combination of a suitable support, a phorometer, a maddox rod, a double rotary prism and a series of cylindrical lenses, the said cylindrical lenses being mounted to be brought into visual alinement with the lenses of the said phorometer with the lenses of the double rotary prism and with the said maddox rod.

15. In an optical instrument, the combination of a suitable support, a phorometer, a maddox rod, a double rotary prism, a series of spherical lenses and a series of cylindrical lenses, the said spherical lenses and the said cylindrical lenses being mounted to be brought routinely into visual alinement with the lenses of said phorometer, the lenses of the said double rotary prism and with said maddox rod.

16. In an optical instrument, a plurality of supports, means for laterally adjusting said supports with respect to each other, a train of spherical lenses carried by each of said supports, and a phorometer, the spherical lenses being mounted to be brought routinely into visual alinement with the lenses of said phorometer.

17. In an optical instrument, the combination of a suitable support, a phorometer adjustably mounted whereby the same may be thrown into or out of operative position, and a series of spherical lenses, the said spherical lenses being mounted to be brought routinely into visual alinement with the said phorometer when the latter is in operative position.

18. In an optical instrument, the combination of a suitable support, a double rotary prism adjustably mounted whereby the same may be thrown into or out of operative position, and a series of spherical lenses, the said spherical lenses being mounted to be brought routinely into visual alinement with the said double rotary prism when the latter is in operative position.

19. In an optical instrument, a plurality of supports, means for laterally adjusting said supports with respect to each other, a train of cylindrical lenses carried by said supports, and a phorometer, the cylindrical lenses being mounted to be brought routinely into visual alinement with the lenses of said phorometer.

20. In an optical instrument, the combination of a suitable support, a phorometer adjustably mounted whereby the same may be thrown into or out of operative position, and a series of cylindrical lenses, the said cylindrical lenses being mounted to be brought routinely into visual alinement with the said phorometer when the latter is in operative position.

21. In an optical instrument, the combination of a suitable support, a double rotary prism adjustably mounted whereby the same may be thrown into or out of operative position, and a series of cylindrical lenses, the said cylindrical lenses being mounted to be brought routinely into visual alinement with the said double rotary prism when the latter is in operative position.

HENRY L. DE ZENG.

Witnesses:
WM. CANER WIEDERSEIM,
C. D. McVAY.